J. ROBBINS.

Improvement in Snap-Hooks.

No. 115,897. Patented June 13, 1871.

Witnesses:
Eugene C. Adams,
J. West Wagner

Inventor:
Julius Robbins
by Johnson, Klaucke & Co.
his Attorneys

UNITED STATES PATENT OFFICE.

JULIUS ROBBINS, OF AUBURN, NEW YORK.

IMPROVEMENT IN SNAP-HOOKS.

Specification forming part of Letters Patent No. 115,897, dated June 13, 1871.

I, JULIUS ROBBINS, of Auburn, in the county of Cayuga and State of New York, have invented a new and useful Improvement in Harness Snap-Hooks, of which the following is a specification:

My invention relates to snap-hooks for harness; and my improvement consists in making the shank of the hook hollow and providing it with a free-moving follower arranged to act directly upon the cam-shaped end of the tongue, so that the outward pressure of the follower, by means of a spring, tends constantly to close and to keep the tongue closed with the hook, while the spring is entirely inclosed with the shank of the hook and has no attachment whatever with the tongue, and the follower is independent of the tongue and simply bears against its inner side in a line between the hinge of the tongue and its point of junction with the hook, so that there is no fixed connection of the parts, the tongue and follower being removable at pleasure, which greatly relieves the device from liability to clog or be broken.

Figure 2:
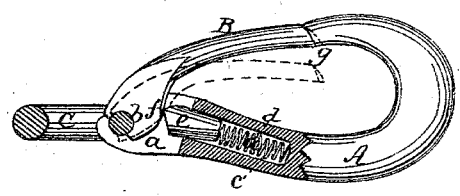

The hook A is of the usual form, and has an opening, $a$, at its loop end to receive the open end $b$ of the tongue B, which closes the mouth of the hook. This open end $b$ fits over a pin, $b^2$, formed in the loop C, which is cast with the shank of the hook. The shank of the hook is provided with an opening, $c$, to receive a spiral spring, $d$, and a separate pin-follower, $e$, the inner end of which bears against the spring $d$, while its outer end bears directly against and upon the inner side of the open end of the tongue, as shown in Fig. 2; and in order that this bearing-point may operate to keep the tongue closed with the mouth of the hook, the inner under side of the tongue is curved so as to act as a cam, $f$, upon the outer end of the separate follower, $e$, the position of which is such that its force shall be exerted upon the tongue B near its socket end, but between said point $b$ and its junction with the mouth $g$ of the hook, so that by depressing the free end of the tongue B the follower $e$ will be forced into its socket $c$ against the spring $d$, which latter, by its force, will thrust out the follower $e$ when the hook is applied to the bit-ring or other device, and thus force the tongue into and hold it in its closed position, as shown in the drawing, in which—

Figure 1:
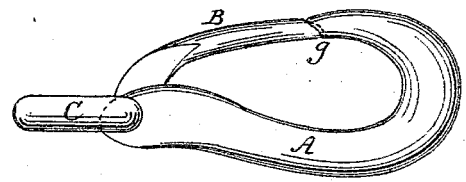
Figure 3:
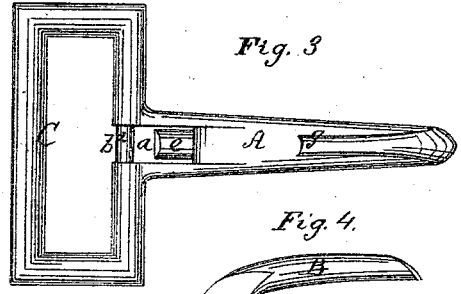
Figure 4:

Figure 1 represents a side view of my improved snap-hook. Fig. 2 represents a partial sectional view of the same with the tongue closed. Fig. 3 represents a plan of the hook; and Fig. 4, a side view of the detachable tongue, which is made with a socket end, so that it can be applied to the loop cross-pin $b^2$ by simply pressing the follower back within its socket; and in this way both the tongue and the follower can be applied to the loop, after it is made, without any fastening whatever.

Having described my invention, I claim—

1. The construction and arrangement of the hook A with its open socket $c$, loop cross-pin $b^2$, and pin-follower $e$, and the tongue B with its open socket $b$ and cam $f$, the whole arranged and operating as described.

2. The tongue, provided with a cam, $f$, and an opening or socket, $b$, permitting it to be applied to the cross-pin $b^2$ of the loop C, in connection with the pin-follower, $e$, as described.

In witness whereof I have hereunto set my hand.

JULIUS ROBBINS.

Witnesses:
NATHAN S. POSSONS,
GEORGE A. BRADY.